United States Patent
Malvadkar et al.

(10) Patent No.: US 11,697,704 B2
(45) Date of Patent: Jul. 11, 2023

(54) ALDIMINE CONTAINING GLASS BONDING PRIMER

(71) Applicant: DDP Specialty Electronic Materials US, LLC, Wilmington, DE (US)

(72) Inventors: Niranjan Malvadkar, Auburn Hills, MI (US); Daniel P. Sophiea, Auburn Hills, MI (US); Jamie M. Weishuhn, Midland, MI (US)

(73) Assignee: DDP Specialty Electronic Materials US, LLC, Wilmington, DE (US)

(*) Notice: Subject to any disclaimer, the term of this patent is extended or adjusted under 35 U.S.C. 154(b) by 250 days.

(21) Appl. No.: 17/081,112

(22) Filed: Oct. 27, 2020

(65) Prior Publication Data

US 2021/0040259 A1   Feb. 11, 2021

Related U.S. Application Data

(62) Division of application No. 16/340,869, filed as application No. PCT/US2017/054690 on Oct. 2, 2017, now abandoned.

(60) Provisional application No. 62/409,454, filed on Oct. 18, 2016.

(51) Int. Cl.
| | | |
|---|---|---|
| *C08G 18/32* | (2006.01) | |
| *C09J 7/50* | (2018.01) | |
| *C08G 18/28* | (2006.01) | |
| *C08G 18/38* | (2006.01) | |
| *C08G 18/50* | (2006.01) | |
| *C08G 18/58* | (2006.01) | |
| *C08G 18/72* | (2006.01) | |
| *C08G 18/73* | (2006.01) | |
| *C08G 18/76* | (2006.01) | |
| *C08G 18/79* | (2006.01) | |
| *C08G 18/80* | (2006.01) | |
| *C09J 175/04* | (2006.01) | |

(52) U.S. Cl.
CPC ....... *C08G 18/3256* (2013.01); *C08G 18/289* (2013.01); *C08G 18/2895* (2013.01); *C08G 18/3844* (2013.01); *C08G 18/503* (2013.01); *C08G 18/584* (2013.01); *C08G 18/725* (2013.01); *C08G 18/73* (2013.01); *C08G 18/7664* (2013.01); *C08G 18/795* (2013.01); *C08G 18/809* (2013.01); *C09J 7/50* (2018.01); *C09J 175/04* (2013.01)

(58) Field of Classification Search
None
See application file for complete search history.

(56) References Cited

U.S. PATENT DOCUMENTS

| | | | |
|---|---|---|---|
| 4,677,180 A * | 6/1987 | Schmitt ............... | C08G 18/089 528/45 |
| 5,238,993 A | 8/1993 | Hsieh | |
| 5,852,137 A | 12/1998 | Hsieh et al. | |
| 2010/0048770 A1 | 2/2010 | Burckhardt | |
| 2010/0101455 A1* | 4/2010 | Burckhardt ........ | C08G 18/4812 528/68 |
| 2011/0198030 A1 | 8/2011 | Burckhardt | |

OTHER PUBLICATIONS

Bostik Blog; Vitel(R) Series; Web Address: https://www.bostik-industrial.com/vitel-series/; Oct. 19, 2020.
Bayer Materialscience Safety Data Sheet according to Regulation (EU) No. 1907/2006; Desmodur RFE; Jun. 4, 2011.
Dow; Paraloid(TM) Reactive Modifier QM-1007M, data sheet.
Dow; Papi(TM) 20 Polymeric MDI, data sheet.

\* cited by examiner

*Primary Examiner* — Ana L. Woodward

(57) ABSTRACT

A novel primer composition contains aldimine and/or epoxy resins, a process of making such primer to be used in glass bonding adhesive kit.

8 Claims, No Drawings

ALDIMINE CONTAINING GLASS BONDING PRIMER

The present invention relates to a new primer composition or "primer" having unique properties in automotive related applications, particularly in glass bonding applications.

A typical, glass bonding adhesive kit contains a primer composition and a moisture cured urethane adhesive. The glass bonding primer typically contains organic solvents, organosilane intermediates, isocyanate prepolymers, film formers, carbon black, catalysts, and stabilizers. The primer modifies the surface of the glass to enable good bonding with the moisture cured urethane adhesive. The isocyanates within the primers undergo moisture curing to produce a crosslinked thermoset network which makes the primer robust enough to have sufficient durability under ambient conditions. However, the primer has to have enough cross-link density to sustain high temperature and humidity conditions. Under these conditions, traditional primers containing the above components tend to lose crosslink density thereby delaminating from the glass surface. Therefore, this is a desire to develop a new primer to have sufficient crosslink density even under the high temperature and humidity conditions.

In one aspect of the invention, the present invention provides a new primer that contains one or more aldimines which act as latent crosslinkers to result in improved hydrolytic stability. In another aspect of the present invention, these new primers do not contain or substantially free of carbon black, which are typically added in glass bonding primers as reinforcement to improve its durability. However, incorporation of carbon black in the primer requires a separate milling step, which is highly time and energy intensive. Elimination of carbon black therefore simplifies the manufacturing complexity and reduces the overall cost The primer of the present invention typically contains A) 15-45 wt. %, preferably 20-40 wt. % and more preferably 25-35 wt. % of an organic solvent such as acetone and/or methyl ethyl ketone;

B) 2-10 wt. %, preferably 2.5-8 wt. % and more preferably 3-7 wt. % of an aldimine such as dialdimine;

C) 2-17 wt. %, preferably 3-15 wt. % and more preferably 4-12 wt. % of an alkoxysilane intermediate, also known as adduct in U.S. Pat. No. 5,852,137, incorporated herein by referent in its entirety by, which is the reaction product of gamma-mercaptopropyltrimethoxysilane and hexamethylene diisocyanate (HDI) biuret; The chemistry and the making of intermediate is well described and taught in U.S. Pat. No. 5,852,137, particularly between column 5 line 25 and column 7, line 15 and the examples. The alkoxysilane intermediate used in the present invention is also taught in U.S. Pat. No. 5,238,993, also incorporated herein by reference in its entirety, and is disclosed as Example 1 of U.S. Pat. No. 5,238,993;

D) 0-10 wt. %, preferably 4-8 wt. % and more preferably 5-7 wt. % of diglycidyl ether of bisphenol A, an epoxy resin such as D.E.R.™ 332;

E) 15-35 wt. %, preferably 20-33 wt. % and more preferably 23-30 wt. % of a non-reactive film forming resin such as VITEL® 2301 BU (40 wt. % solution in methyl ethyl ketone);

F) 18-30 wt. %, preferably 20-28 wt. %, and more preferably 22-26 wt. % of aliphatic and aromatic polyisocyanate prepolymers such as Desmodur® RFE, Desmodur® HL and PAPI™ 20:

G) 1-3 wt. %, preferably 1.5-2.5 wt. % and more preferably 2-2.2 wt. % of reactive modifier such as an oxazolidine containing compound PARALOID™ QM-1007;

H) 0.1-0.3 wt. %, preferably 0.15-0.25 wt. % and more preferably 0.2-0.22 wt. % of a catalyst such as KKAT® 670; and I) 0.2-0.5%, preferably 0.25-0.4 wt. % and more preferably 0.3-0.35 wt. % of an isocyanate stabilizer such as diethyl malonate.

As discussed above, a unique component for all the primers of the present invention is the use of one or more aldimines in the primer. Aldimines are Schiff bases prepared by reacting an aldehyde with a primary amine to form an imine functionality. Aldimines undergoes hydrolysis in presence of moisture to release back the aldehyde and amine. Amines released from this hydrolysis reaction can then react with isocyanate groups or epoxy groups to increase crosslink density of the primer coating. In addition, the aldimine also helps to stabilize the primer and extends the shelf life of the primer. In a preferred embodiment, the aldimine used in the primer is a dialdimine.

In addition to aldimines, epoxy resins, which are also capable of reacting with amines, may also be added to the primer to provide additional toughness, durability, and moisture barrier. Epoxy resins such as bisphenol A digylcidyl ether provides excellent barrier properties when cured with an amine. As a result, the hydrolytic stability of the primer is greatly improved when epoxy resin is added. The primers containing epoxy resin have lower susceptibility to blistering after immersion in 90° C. water for 10 days. It is important to note that epoxy resin that have hydroxyls present may trigger reaction with isocyanates present in the primer composition, leading to gelling. Therefore, it is important to select epoxy resins without any hydroxyl functionality. In a preferred embodiment, an epoxy resin DER 332, commercially available from Olin Corporation, is used in the primer composition.

The presence of aldimines and epoxy in primer increases glass bonding strength of the primer and also improves the hydrolytic stability. In addition, link up rate, using the primer of the present invention, with moisture-cured urethane adhesives traditionally used in automotive applications is very similar to that of the traditional black milled primers. However, since in some preferred embodiment, these new primers do not contain carbon black, the cost of manufacturing is significantly lower compared to traditional black primers.

EXAMPLES

The present invention can be further demonstrated with the following non-limiting examples.

Table 1 illustrates the various raw material components and their sources used in the making the examples to demonstrate the present invention.

TABLE 1

Components used in the present invention

| Component | Component Type | Description | Supplier |
|---|---|---|---|
| A | solvents | acetone and methyl ethyl ketone (Ratio by weight = 1:1) | Sigma Aldrich |
| B | dialdimine | Incozol BH | Incorez |
| C | alkoxysilane intermediate | reaction product of gamma-mercaptopropyltrimethoxysilane (e.g., Silquest ® A189) and hexamethylene diisocyanate(HDI) biuret (e.g., Desmodur ® N100) | Silquest ® A189 from Momentive and Desmodur ® N100 from Covestro AG |
| D | diglycidyl ether of bisphenol A | DER. ™ 332 | Olin Corporation |
| E | film forming resin | VITEL ® 2301 BU (40 wt.% solution in methyl ethyl ketone) | Bostik |
| F | aliphatic and aromatic polyisocyanates | Desmodur ® RFE, Desmodur ® HL, and PAPI ™ 20 (Ratio by weight = 1:1:2.67) | Desmodur ® RFE, Desmodur ® HL from Covestro AG and PAPI ™ 20 Dow Chemical Company |
| G | oxazolidine reactive modifier | PARALOID ™ QM-1007 | Dow Chemical Company |
| H | catalyst | KKAT ® 670 or FOMREZ UL28 | KKAT ® 670 from King Industries and FOMREZ UL28 from Momentive |
| I | isocyanate stabilizer | diethyl malonate | Sigma Aldrich |

Table 2 summarized various Examples prepared to demonstrate the present invention. Examples 1 to 6 are inventive samples that contain aldimine while Examples 7 to 10 are comparative samples that do not contain aldimine.

TABLE 2

Contents of Various Examples Prepared.

| Component | Ex 1 | Ex 2 | Ex 3 | Ex 4 | Ex 5 | Ex 6 | Ex 7 | Ex 8 | Ex 9 | Ex 10 |
|---|---|---|---|---|---|---|---|---|---|---|
| A | 30.84 | 30.86 | 30.87 | 30.87 | 25.87 | 35.87 | 30.86 | 30.87 | 30.87 | 35.87 |
| B | 3.34 | 6.67 | 5 | 5 | 5 | 5 | 0 | 0 | 0 | 0 |
| C | 10.01 | 6.67 | 5 | 5 | 10 | 5 | 6.68 | 15 | 15 | 5 |
| D | 6.68 | 6.67 | 5 | 5 | 5 | 5 | 13.33 | 0 | 0 | 5 |
| E | 23.23 | 23.23 | 28.23 | 28.23 | 28.23 | 28.23 | 23.23 | 28.23 | 28.23 | 28.23 |
| F | 23.37 | 23.37 | 23.37 | 23.37 | 23.37 | 23.37 | 23.37 | 23.37 | 23.37 | 23.37 |
| G | 2 | 2 | 2 | 2 | 2 | 2 | 2 | 2 | 2 | 2 |
| H | 0.2 [1] | 0.2 [1] | 0.2 [1] | 0.2 [2] | 0.2 [2] | 0.2 [2] | 0.2 [1] | 0.2 [1] | 0.2 [2] | 0.2 [2] |
| I | 0.33 | 0.33 | 0.33 | 0.33 | 0.33 | 0.33 | 0.33 | 0.33 | 0.33 | 0.33 |

[1] Using Fomrez UL28 available from Momentive
[2] Using KKAT 670 available from King Industries In addition, two commercial black primers were also used as comparative examples. The first primer, Example 11, is a commercial two-step glass bonding primer known as BETASEAL™ 43520A, commercially available from the Dow Chemical Company, which contains carbon black but does not contain aldimine or epoxy resin. The primer has to be used in conjunction with BETASEAL™ 43518, commercially available from the Dow Chemical Company, which is a solvent based silane blend. During glass bonding, BETASEAL™ 43518 is first applied on the glass side to condition the glass surface. BETASEAL™ 43520A is then applied on the conditioned glass surface.

Another comparative primer example, Example 12, is a commercial one-step primer known as BETAPRIME™ 5504G, also available from the Dow Chemical Company, which contains carbon black but does not contain aldimine or epoxy resin. The primer is directly applied on the glass surface.

All samples were prepared in the following manner:

Primer for glass bonding of the present invention was prepared using a 2-step process. In the first step, Component C was prepared by combining Desmodur® N 100 (aliphatic hexamethylene diisocyanate based polyisocyanate) and SILQUEST® A189 (gamma-mercaptopropyltrimethoxysilane) and methylethylketone to get a 70% solids solution. Desmodur® N 100 and SILQUEST® A189 were added to get 3:1 equivalents of isocyanate and the mercapto groups. FASCAT 4202 (dibutyltin dilaurate) catalyst was then added to the blend. The solution was allowed to react in a reaction vessel at 60° C. until all mercapto groups were consumed. The resulting reaction product is the organosilane intermediate (Component C of Table 1). The rest of the components given in Table 1 were then added in an aluminum container. The organosilane intermediate was added along with the catalyst (Component H). The components were then stirred using a tongue depressor.

Comparative Examples (Examples 7-10) were similarly prepared without the addition of aldimine.

Both kinds of Example primes were used to study adhesion performance of the primer on 3"×5" glass substrates.

The glass substrates were cleaned with acetone and isopropanol prior to applying the primers. The primers were applied using a 1 mil drawdown bar. The primer was allowed to cure for under ambient condition for the required amount of time.

The performances of primer of the present invention were evaluated using the following test methods:

Scratch Adhesion Test: Adhesion test was performed by coating the primer on a glass substrate using a 1 mm diameter hemispherical stainless steel scratch head. After curing the primers for 24 hours, scratches were applied on the primer surface using this scratch head. For each test, a set of 8 scratches were applied by varying the normal load from 200 to 1000 g. The minimum force required to remove the primer from the glass surface was reported as the adhesion force between the primer and glass.

Shelf Stability Test: Freshly prepared primers stored in aluminum bottles were placed in 54° C. oven for 3 days. After 3 days, bottles were removed from the oven. Primers that gelled do not pass the shelf stability test, whereas the primers that do not gel pass the shelf stability test.

Hydrolytic Stability Test: Glass coated with the primer was allowed to cure for 7 days under ambient condition. The primer coated glass was then immersed in 90° C. water bath for 10 days. After 10 days, the primer coated glass was removed from the water bath and air dried for 4 hours. Finally, the scratch adhesion test was performed on this primer and the minimum adhesion force required to remove the primer from the substrate was recorded.

Quick Knife Test (SAE J1720): a 6.3 mm (width)×6.3 mm (height)×100 mm (length) bead of BETASEAL Express adhesive was placed on the primer coated substrate. The adhesive was cured under the conditions of 23° C. and 50 percent relative humidity for 24 hours. The cured bead was then cut with a razor blade through to the substrate at a 45° angle while pulling back the end of the bead at 180° angle. Notches were cut every 3 mm on the substrate. The adhesion failure was noted as 1. Cohesive Failure (CF), i.e., adhesion failure occurring within the adhesive; as 2. Adhesive failure to Primer (AFP), i.e., failure at primer adhesive interface; and as 3. Primer failure to glass (PFG), i.e., failure at primer glass interface.

Lap Sheer Test: Primer samples were coated on plate glass and were allowed to dry for 1 hour. Adhesive bead of BETASEAL Express, commercially available from The Dow Chemical Company, was applied on the dried primers. An e-coat coupon was then placed on the bead in a lap assembly. The adhesive was allowed to cure for 24 hours prior to lap sheer test. Lap sheer was performed by pulling the two substrates at a rate of 5 inch/min. The peak force required to pull the two substrate apart and the adhesion failure mode was recorded.

All above performance test results are summarized in Table 3.

TABLE 3

Performance of Inventive Examples and Comparative Examples

|  | Ex 1 | Ex 2 | Ex 3 | Ex 4 | Ex 5 | Ex 6 |
|---|---|---|---|---|---|---|
| Color | Clear | Clear | Clear | Clear | Clear | Clear |
| Type | 1-step | 1-step | 1-step | 1-step | 1-step | 1-step |
| Shake before use | No | No | No | No | No | No |
| Adhesion after 24 hours | 900 | 1000 | 1000 | 1000 | 1000 | 1000 |
| Adhesion after 10 day 90 C. water soak | 900 | 967 | 1000 | 967 | 1000 | 767 |
| Blistering after 10 d 90 C. water soak | None | Moderate | None | None | None | Severe |
| Shelf Stable (54° C. Gel test) | No | No | No | Yes | Yes | Yes |
| Quick knife test (Express on glass, 1 d RT) |  | 95CF/5PFG | 100CF | 95CF/5PFG | 90CF/10PFG | 95CF/5PFG |
| Quick knife test (Express on glass, 7 d RT) | 100CF | 90CF/10PFG | 95CF/5PFG | 95CF/5PFG | 90CF/10PFG | 95CF/5PFG |
| Quick knife test (X2500 on glass, 1 d RT) |  | 100 CF | 100CF | 95CF/5PFG | 90CF/10PFG | 90CF/10PFG |
| Quick knife test (X2500 on glass, 7 d RT) |  | 100 CF | 100CF | 100CF | 5CF/95PFG | 50CF/50PFG |
| Lap Sheer (Express on clear glass) RT |  |  | 581 (100CF) | 577 (100CF) |  |  |
| Lap Sheer (Express on clear glass) 10 d at 90° C. water |  |  | 165 (100AF to ecoat) | 179 (100AF to ecoat) |  |  |

|  | Ex 7 | Ex 8 | Ex 9 | Ex 10 | Ex 12 | Ex 13 |
|---|---|---|---|---|---|---|
| Color | Clear | Clear | Clear | Clear | Black | Black |
| Type | 1-step | 1-step | 1-step | 1-step | 2-step | 1-step |
| Shake before use | No | No | No | No | Yes | No |

TABLE 3-continued

Performance of Inventive Examples and Comparative Examples

| | | | | | | |
|---|---|---|---|---|---|---|
| Adhesion after 24 hours | 967 | 967 | 967 | 1000 | 1000 | 600 |
| Adhesion after 10 day 90 C. water soak | 400 | 300 | 767 | 700 | 1000 | 1000 |
| Blistering after 10 d 90 C. water soak | Moderate | Slight | Moderate | Slight | None | None |
| Shelf Stable (54° C. Gel test) | No | No | No | No | Yes | Yes |
| Quick knife test (Express on glass, 1 d RT) | | | 95CF/5PFG | 95CF/5PFG | | |
| Quick knife test (Express on glass, 7 d RT) | | 100CF | 90CF/10PFG | 90CF/10PFG | 100 CF | 100 CF |
| Quick knife test (X2500 on glass, 1 d RT) | | | 95CF/5PFG | 95CF/5PFG | | |
| Quick knife test (X2500 on glass, 7 d RT) | | | 98CF/2PFG | 95CF/5PFG | | |
| Lap Sheer (Express on clear glass) RT | | 523 (100CF) | | | | |
| Lap Sheer (Express on clear glass) 10 d at 90° C. water | | 100 (100AF to ecoat) | | | | |

Table 3 shows the performance of the inventive primer examples and the comparative examples. All primers, with the exception of Ex 13, showed good adhesion to the glass surface after 24 hour cure. The adhesion value for these primers exceeds the maximum measurable value of the instrument (i.e., 1000 g). In comparison, Ex 13 primer has relatively low dry adhesion value (600 g), which can be attributed to the slow cure kinetics of the primer.

The Scratch Adhesion Test performed after 10 days in 90° C. water soak demonstrates the hydrolytic stability of the primers. Adhesion values after 10 days 90° C. water soak are provided in Table 3.

It is clearly evident that the inventive primers perform much better than the comparative examples. Both epoxy resin and aldimine are required to enhance hydrolytic stability of the primer. Primers of Examples 1, 2, 3, 4, and 5 contain both epoxy and aldimine and resulted in excellent hydrolytic stability, as seen by the scratch test performed after immersing the primer in 90° C. water for 10 days. In addition, the lap sheer test performed after immersing the assembly in 90° C. water for 10 days also show that presence of both aldimine and epoxy is needed to have better lap sheer performance. Primer of Example 6, which contains the aldimine but not the epoxy resin, shows excellent adhesion at room temperature as evident from the scratch test. However, the hydrolytic stability of this primer is slightly lower compared to the primers of Examples 1 through 5. In addition, this primer also shows more severe blistering relative to the primers of Examples 1 to 5. In the absence of both epoxy and the aldimine, the primers have lower hydrolytic stability (Examples 6, 7, 10, and 11).

In addition, the aldimine helps to stabilize the primer and therefore enhances the shelf stability of the primer. Shelf stability also depends on the catalyst used. In the case of a tin catalyst such as FOMREZ UL28, as used in Examples 1, 2, and 3, primers do not pass the 54° C. gel test indicating a shorter shelf life. In comparison, primers containing a non-tin catalyst such as KKAT 670, as used in Examples 4 and 5, are more likely to pass the 54° C. gel test. However, even if the primer contains KKAT 670 as the catalyst, it can still fail the gel test when aldimine is absent in the composition. This is evident in Examples 9 and 10. Both of these primers do not contain aldimine and therefore fail the gel test.

Quick knife test was performed to evaluate the link up rate with moisture-cured urethane adhesives. All primer show excellent linkup time (100% cohesive failure) with BETASEAL Express as the urethane adhesive after 7 day adhesive cure. The presence of aldimine and/or epoxy does not compromise the link up rate of the primer to adhesive.

It is also observed that in the preferred embodiment of the present invention primer contains a dialdimine such as INCOZOL BH (commercially available from Incorez), which is a reaction product of polyetheramines (e.g., JEFFAMINE D400, commercially available from Huntsman) and benzaldehyde.

What is claimed is:

1. A primer composition comprising, based on the total weight of the composition: an organic solvent, selected from acetone, methyl ethyl ketone, and a mixture thereof;
    an aldimine;
    an alkoxysilane;
    a non-reactive film forming resin;
    a polyisocyanate prepolymer;
    a reactive modifier, which is an oxazolidine-containing compound;
    a catalyst;
    an isocyanate stabilizer, which is diethyl malonate; and
    diglycidyl ether of bisphenol A; wherein the diglycidyl ether of bisphenol A is present at less than 10 wt %.

2. The primer composition of claim 1 which is substantially free of carbon black.

3. The primer composition of claim 1 wherein the aldimine is a dialdimine.

4. The primer composition of claim 1 wherein the aldimine is reaction of polyetheramines and benzaldehyde.

5. The primer composition of claim 1 wherein alkoxysilane is a reaction product of gamma-mercaptopropyltrimethoxysilane and hexamethylene diisocyanate(HDI) biuret.

6. The primer composition of claim 1 wherein the diglycidyl ether of bisphenol A is present at 4-8 wt %.

7. The primer composition of claim 1 wherein the diglycidyl ether of bisphenol A is present at 5-7 wt %.

8. The primer composition of claim 1 wherein the catalyst is a non-tin catalyst.

* * * * *